Feb. 3, 1931.  C. BAULINO  1,790,968
MEANS FOR COMPARING THE FUEL CONSUMPTION OF THE SEPARATE
CYLINDERS OF ENGINES FOR REGISTERING PURPOSES
Filed Nov. 26, 1926
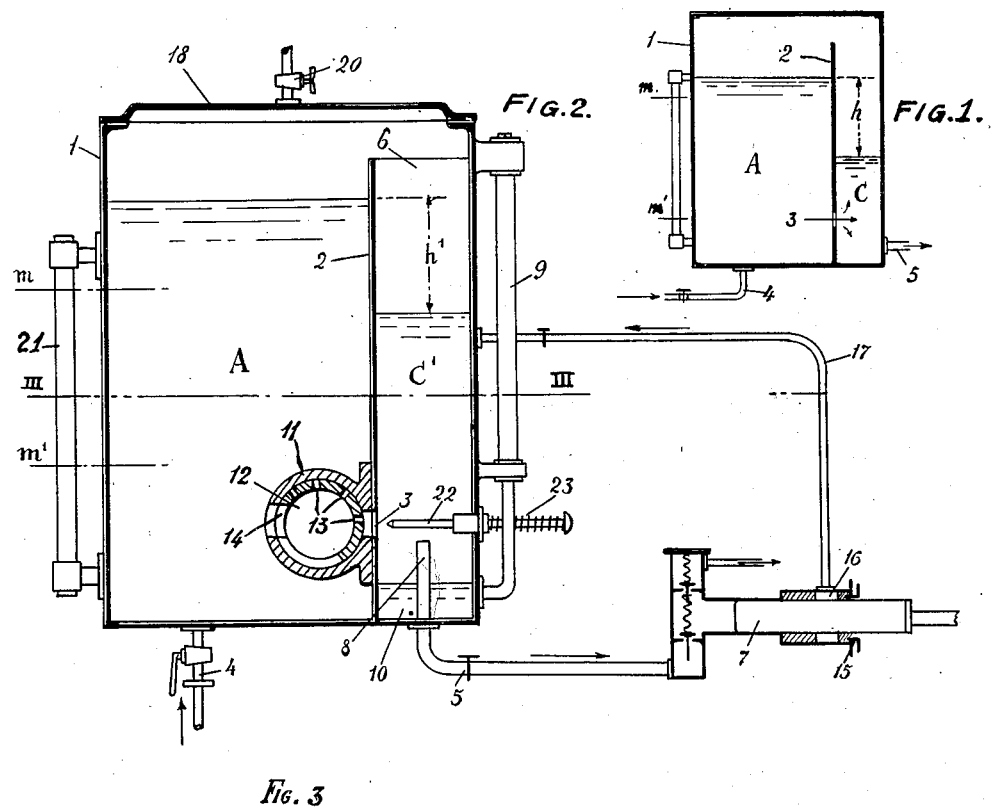
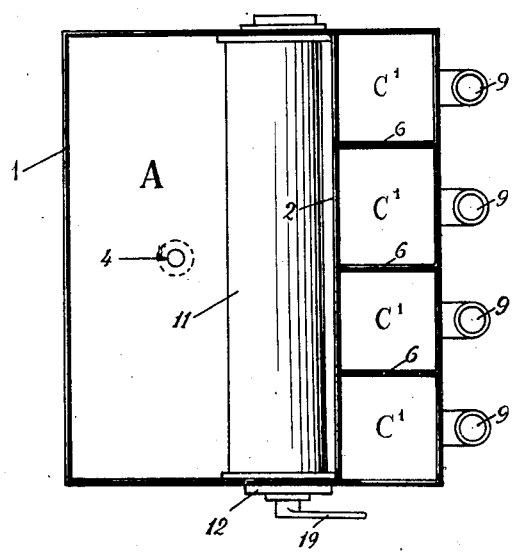

Patented Feb. 3, 1931

1,790,968

UNITED STATES PATENT OFFICE

CARLO BAULINO, OF GENOA, ITALY

MEANS FOR COMPARING THE FUEL CONSUMPTION OF THE SEPARATE CYLINDERS OF ENGINES FOR REGISTERING PURPOSES

Application filed November 26, 1926, Serial No. 150,986, and in Great Britain November 27, 1925.

This invention relates to means for measuring the relative rate of fuel consumption of each of the cylinders of a multiple cylinder internal combustion engine using liquid fuel and specially non-volatile fuel, and is specially adapted for those engines in which each power cylinder is fed by a separate injecting mechanism.

It is known that one of the greatest difficulties experienced with engines of such types is to insure that each of the cylinders receives at all loads the same quantity of fuel as the others.

It is also often desirable to know exactly and readily the total consumption per hour of fuel, when the motor is running under a certain load.

The principal object of the present invention is to provide improved means which are very simple and of easy construction and which will give a continuous indication of the relative rate of flow of the fuel to each cylinder, thus enabling the engine driver to regulate the feeding means so as to cause the fuel to be distributed equally between the different cylinders, which thus will be equally loaded; such means being of the kind comprising a series of separate supply tanks or secondary tanks, each of which supplies the fuel to the feeding device of one of the cylinders, all the secondary supply tanks being in communication through cock-controlled ports with a common or primary tank; each of the secondary tanks and the primary tank being provided with, or connected to, suitable level gauges.

Another object of the present invention is to provide a method by which it is possible, with the above device, to measure in a few minutes the consumption of fuel per hour of the engine working under a given load, without necessity either of additional instruments or complicated calculations, such method consisting substantially in cutting out all communication between the primary fuel tank and the main supply tank and reading on the indicator of the fuel level in the primary tank the volume of the fuel supplied to the working cylinders during the testing period, or also by observing the time in which the engine has burnt a certain amount of fuel.

The invention further provides a method by which the level of the fuel in each of the tanks can be readily and exactly read on the level gauges, regardless of the viscosity or the color of the liquid fuel employed.

With these and other ends in view, the present invention consists in the construction, and specially in the combination and arrangement of parts and in the method of operation, to be fully described hereinafter, with reference to the accompanying drawings, in which the principles of the invention and a practical embodiment of same are illustrated by way of example.

In the drawings:

Figure 1 diagrammatically shows a longitudinal section through a device embodying the principles of the invention;

Figure 2 shows, on enlarged scale, the same device, and also some of the constructional details of one practical embodiment;

Figure 3 is a horizontal section taken on the line III—III of Fig. 2, parts being omitted for the sake of clarity.

The principle on which the invention is based is the following:

A parallelepipedal (or also cylindrical) tank 1 of suitable material and capacity, is internally divided into two compartments A and C respectively, by a vertical wall 2, which, however, does not reach the upper or top cover of the said tank 1, and thus the two compartments are in communication from above. Further, if at a convenient height from the bottom a hole 3 of suitable diameter is bored through the wall 2, by letting into the compartment A a liquid, for instance through pipe 4, this liquid will reach the same height in both the compartments A and C, but if some liquid is drawn out continuously, at a certain rate, from the compartment C through the port and pipe 5, before the liquid in the compartment A has reached the upper side of the wall 2, a difference in level —h— will occur between the liquid in the compartment A and that in the compartment C. This difference in level will be such as to form a difference in pressure permitting of a flow of a quantity of liquid through port 3, which will be equal to the quantity of liquid delivered through pipe 5. It is known from hydrodynamics that when liquid is continuously delivered to the compartment C, if Q is the quantity of liquid flowing through the section area S of the port 3, will be:

$$Q = K.S\sqrt{h}$$

in which formula K is a constant which depends on the nature of the liquid and the shape of the port 3. From the above formula one knows that $$h = \frac{Q^2}{K^2.S^2}$$

or, in other words that $h$ is proportional to the square of the quantity of liquid delivered from the compartment C in the time unit.

Now, if C is divided into a number of equal compartments C' by means of transverse walls 6 (Figures 2 and 3) and each of these compartments is provided with a delivery pipe 5 and an inlet port 3, through which it receives liquid from the main tank A, if the ports 3 are all equal and arranged in like manner in each of the compartments C', the differences in level $h'$ between the liquid in each of the compartments and the liquid in the primary tank A will be proportional to the squares of the deliveries from the compartments C'. Consequently, in order that the different deliveries be equal, it will be sufficient to regulate the delivery-controlling means so as to maintain the level of the liquid in all of the compartments C' at the same height.

Figures 2 and 3 diagrammatically show a practical embodiment of such principle. Each power cylinder of the engine is supplied with fuel taken from one of the compartments C', and thus the arrangement shown is designed for a four-cylinder combustion engine. A separate feeding device or pump 7 is provided for each of the cylinders, this pump drawing fuel out of the corresponding compartment C' through pipe 5, the inlet port 8 of which is arranged at a suitable height above the bottom level of the compartment C' for the purposes set forth hereinafter. Conveniently, this pipe might be provided with an extension or prolongation 8 projecting upwardly to the required height into the said chamber C'. Now, as the liquid fuel for high-power combustion engines is generally somewhat viscous and dark colored, and consequently if introduced in small diameter gauge tubes the exact reading of its level would be somewhat difficult and not completely exact, it is preferred, according to the present invention, to pour into the compartments C' a colored, non-viscous liquid, which does not mix with the fuel and having a specific gravity slightly greater than that of the fuel.

Of course, the maximum level of this liquid will be somewhat under the level of the upper end or inlet of the tube 8 and that of the port 3. In this manner, when the liquid fuel is let into the compartments C', the colored liquid 10 will be forced up in the gauge tubes 9 and mark the level of the fuel in the compartments C'. As the inlet of pipe 5 is somewhat above the level of the indicating liquid, it will draw out of the compartment C' only liquid fuel.

As said, the main tank A is in communication with each of the compartments C' through ports 3, but, as the density and viscosity of the liquid fuel could vary within considerably large limits, thus causing the coefficient K to vary to a certain extent so as to render the indications of the device not entirely reliable, if the section S of port 3 should be constant; according to the invention means are provided to vary the said section S to suit the characteristics of the liquid fuel.

Such means could be constituted by suitable cocks and, according to the embodiment illustrated Figure 2, by means of a single cylindrical cock the plug 12 of which is hollow and formed with a series of holes 13 of different sizes, but having regard that the corresponding holes, i. e. those on the same longitudinal planes passing through the plug, are exactly equal in size and shape. Both the plug and the barrel 11 are divided by walls into as many compartments as there are small tanks C'. By rotating the plug, there can be presented to the ports 3 one or the other of the holes 13, of a size which best suits according to the viscosity of the liquid fuel, while the hollow chamber within the plug is constantly in communication with the tank A through a suitable aperture 14 in the barrel 11 fixed to the wall 2.

It is also known that, owing to the considerable pressure required for injecting the fuel, losses of same are frequent through the stuffing-boxes and joints 15 of the pumps 7. Now, as said losses could appreciably change the results of the device according to the invention, a collecting chamber 16 is formed in suitable position in the suffing box 15 and the fuel collected in this chamber returns through a pipe 17 into its small tank C' and thus the level differences between the different secondary tanks are only due to the different deliveries of fuel to the cylinders.

In the embodiment as shown Figures 2 and 3 an arrangement is shown in order to maintain the level of the fuel in the primary tank A substantially at the same height. An airtight cover 18 hermetically closes the chambers A and C'. The cover is provided with cock 20, through which air may be let in or out, in order that the air pad between the fuel level in the tanks and the cover may have the required thickness.

A gauge tube 21 measuring the level of the liquid in the chamber A is mounted on the wall of the tank, which is opposite to the compartments C.

From the foregoing it is apparent that the working of the device is as follows:

Before starting the engine, liquid fuel is let in the tanks A, C through pipe 4, till it reaches a certain level in the said tanks and then the cock 20 through which the excess air escapes is closed and thus the increase in level of the fluid is practically stopped. Then the cock 11 is opened to the position which is best suited to the characteristics of the fuel employed and the engine is finally started. The injecting pumps draw out fuel from their respective secondary tanks C' and the gauge tubes 9 show a corresponding decrease in the level of the liquid, to a certain point in which the amount of fuel delivered to the injecting pump through pipe 5 is equal to the fuel flowing from the primary tank A into the corresponding secondary tank C' through holes 13, 14 and port 3. Meantime an amount of liquid fuel, which is equal to the sum of the different deliveries to the cylinders, will flow into the chamber A through the conduit 4. Should the level of the liquid in any of the secondary tanks—and consequently in the corresponding gauges—be different from the others, this will mean that the respective cylinders receive a different amount of fuel. This irregularity can be easily overcome by suitably adjusting the injecting pumps or other feed-controlling devices.

In order to know the consumption per hour of fuel, when the engine is running under a certain load, the delivery of fuel to the tank A is stopped for a certain time, or also till the level of the fuel in the tank A drops to a predetermined level $m'$. Having recorded the moment in which the fuel in the tank has reached an upper level $m$ and the moment in which it has reached the said level $m'$, one knows readily by a simple calculation the volume of fuel fed to the engine during the said time and per hour; and the density of the fuel being known, one knows also its weight.

In order to remove any matter obstructing the holes in front of port 3, a slidable pin 22 is mounted in suitable position through each of the secondary tanks C', the said pins being tightly fitted in suitable sleeves and an helical spring 23 being arranged on said pins, so as to normally maintain the said pin in its outward position.

While I have described a preferred embodiment of my invention, I wish that it be understood that my invention is not limited to the details described and shown and that changes are possible within the limits of the appended claims. I also wish it to be understood that certain features of the invention may be employed in other combinations than those herein shown.

I claim:

1. A device for comprising the liquid fuel consumption of the cylinders of an internal combustion engine whereby to afford the indications necessary for permitting an equalizing of such consumption in the various cylinders of an engine, including a main distribution tank adapted to receive the liquid fuel under pressure, and in which the level of the fuel is maintained approximately constant, a separate receiving tank for each cylinder of an engine, means connecting said main distribution tank with the receiving tanks, said connecting means including calibrated orifices arranged adjacent the bottom of the tanks and being of equal size, a liquid level gauge on each of the receiving tanks, and separate conduits connected with each of the tanks and adapted to feed fuel to the corresponding cylinders of an engine.

2. A device for comparing the liquid fuel consumption of the cylinders of an internal combustion engine whereby to afford the indications necessary for permitting an equalizing of such consumption in the various cylinders of an engine, including a main distribution tank adapted to receive the liquid fuel under pressure, and in which the level of the fuel is maintained approximately constant, a separate receiving tank for each cylinder of an engine, means connecting said main distribution tank with the receiving tanks, said connecting means including calibrated orifices arranged adjacent the bottom of the tanks and being of equal size, a liquid level gauge on each of the receiving tanks, and separate conduits connected with each of the tanks and adapted to feed fuel to the corresponding cylinders of an engine, an air tight cover for the main distribution and receiving tanks, and means associated with the cover for admitting air to and exhausting air from said tanks.

3. A device for comparing the liquid fuel consumption of the cylinders of an internal combustion engine whereby to afford the indications necessary for permitting an equalizing of such consumption in the various cylinders of an engine, including a main distribution tank adapted to receive the liquid fuel under pressure, and in which the level of the fuel is maintained approximately constant, a separate receiving tank for each cylinder of an engine, means connecting the main distribution tank with the receiving tanks, said connecting means including a valve plug common to the several receiving tanks and having sets of calibrated orifices, the orifices of each set being of uniform size and the several sets being adapted to be successively brought into registration with the receiving tanks, a liquid level gauge arranged on each of the receiving tanks, and means for co necting the receiving tanks to the cylinders of an engine.

4. A device for comparing the liquid fuel consumption of the cylinders of an internal combustion engine whereby to afford the indications necessary for permitting an equalizing of such consumption in the various cylinders of an engine, including a main distribution tank adapted to receive the liquid fuel under pressure, and in which the level of the fuel is maintained approximately constant, a separate receiving tank for each cylinder of an engine, means connecting said main distribution tank with the receiving tanks, said connecting means including calibrated orifices arranged adjacent the bottom of the tanks and being of equal size, a liquid level gauge on each of the receiving tanks, connected between the connecting means and the bottom of said receiving tanks, and separate conduits connected with each of the tanks and adapted to feed fuel to the corresponding cylinders of an engine, and a liquid mass in each of the receiving tanks having its level located intermediate the calibrated orifices and the point of connection of the level gauge associated with said tank whereby the level of the liquid mass is caused to rise and fall in said level gauge in accordance with the variations in the level of the liquid fuel in the receiving tank.

5. A device for comparing the liquid fuel consumption of the cylinders of an internal combustion engine whereby to afford the indications necessary for permitting an equalizing of such consumption in the various cylinders of an engine, including a main distribution tank adapted to receive the liquid fuel under pressure, and in which the level of the fuel is maintained approximately constant, a separate receiving tank for each cylinder of an engine, means connecting said main distribution tank with the receiving tanks, said connecting means including calibrated orifices arranged adjacent the bottom of the tanks and being of equal size, a liquid level gauge on each of the receiving tanks, connected between the connecting means and the bottom of said receiving tanks and separate conduits connected with each of the tanks and adapted to feed fuel to the corresponding cylinders of an engine, and a liquid mass in each of the receiving tanks having its level located intermediate the calibrated orifices and the point of connection of the level gauge associated with said tank whereby the level of the liquid mass is caused to rise and fall in said level gauge in accordance with the variations in the level of the liquid fuel in the receiving tank, said liquid mass beng non-miscible with the liquid in the receiving tank.

6. A device for comparing the liquid fuel consumption of the cylinders of an internal combustion engine whereby to afford the indications necessary for permitting an equalizing of such consumption in the various cylinders of an engine, including a main distribution tank adapted to receive the liquid fuel under pressure, and in which the level of the fuel is maintained approximately constant, a separate receiving tank for each cylinder of an engine, means connecting said main distribution tank with the receiving tanks, said connecting means including calibrated orifices arranged adjacent the bottom of the tanks and being of equal size, a liquid level gauge on each of the receiving tanks, connected between the connecting means and the bottom of said receiving tanks, and separate conduits connected with each of the tanks and adapted to feed fuel to the corresponding cylinders of an engine, and a liquid mass in each of the receiving tanks having its level located intermediate the calibrated orifices and the point of connection of the level gauge associated with said tank whereby the level of the liquid mass is caused to rise and fall in said level gauge in accordance with the variations in the level of the liquid fuel in the receiving tank, said liquid mass being non-miscible with the liquid in the receiving tank, said conduits communicating with the receiving tanks at a point above the level of the liquid masses therein.

7. A device for comparing the liquid fuel consumption of the cylinders of an internal combustion engine whereby to afford the indications necessary for permitting an equalizing of such consumption in the various cylinders of an engine, including a main distribution tank adapted to receive the liquid fuel under pressure, and in which the level of the fuel is maintained approximately constant, a separate receiving tank for each cylinder of an engine, means connecting said main distribution tank with the receiving tanks, said connecting means including calibrated orifices arranged adjacent the bottom of the tanks and being of equal size, a liquid level gauge on each of the receiving tanks, and separate conduits connected with each of the tanks and adapted to feed fuel to the corresponding cylinders of an engine, fuel pumps connected with the conduits, each pump including a stuffing box, a collecting chamber for the stuffing box for receiving the fuel losses, and a return pipe for returning the fuel to the associated receiving tank.

CARLO BAULINO.